United States Patent [19]

Fukaya et al.

[11] Patent Number: 4,981,519

[45] Date of Patent: Jan. 1, 1991

[54] HYDRAULIC HARDENING MATERIAL AND METHOD OF MANUFACTURING THE SAME

[75] Inventors: Kazuo Fukaya, Tama; Kazuyoshi Sato, Kawasaki; Eiichiro Konishi, Yokohama; Yasushi Iijima, Yokohama; Youichi Ishikawa, Tokyo; Kiyoshi Koibuchi, Yokohama, all of Japan

[73] Assignee: Nippon Kokan Kabushiki Kaisha, Tokyo, Japan

[21] Appl. No.: 77,079

[22] Filed: Jul. 24, 1987

Related U.S. Application Data

[63] Continuation of Ser. No. 899,384, Jul. 24, 1986.

[30] Foreign Application Priority Data

Dec. 11, 1984 [JP] Japan ................................ 59-261083

[51] Int. Cl.$^5$ ................................. C04B 7/14
[52] U.S. Cl. ........................... 106/782; 106/789; 106/756
[58] Field of Search .................. 106/103, 117, 97

[56] References Cited

U.S. PATENT DOCUMENTS

| | | | |
|---|---|---|---|
| 3,565,648 | 2/1971 | Mori et al. | 106/103 |
| 4,451,295 | 5/1984 | Sprouse | 106/117 X |

FOREIGN PATENT DOCUMENTS

| | | | |
|---|---|---|---|
| 0021681 | 6/1980 | European Pat. Off. | |
| 0025824 | 2/1977 | Japan | 106/117 |
| 0067051 | 4/1982 | Japan | 106/103 |
| 1048467 | 3/1986 | Japan | 106/117 |
| 0663671 | 5/1979 | U.S.S.R. | 106/117 |
| 0695981 | 11/1979 | U.S.S.R. | 106/117 |

OTHER PUBLICATIONS

Taylor, "The Chemistry of Cements", 1964, vol. 1, pp. 110–111, and p. 129.

*Primary Examiner*—William R. Dixon, Jr.
*Assistant Examiner*—J. M. Hunter, Jr.
*Attorney, Agent, or Firm*—Frishauf, Holtz, Goodman & Woodward

[57] ABSTRACT

The invention provides a method of manufacturing a hydraulic hardening material having the steps of milling vitreous blast furnace slag and classifying the milled slag to provide slag powder having a blaine specific surface area of 6,000 to 12,000 cm$^2$/g. The hydraulic hardening material manufactured by the method is used as a Portland blast furance cement raw material.

13 Claims, 1 Drawing Sheet

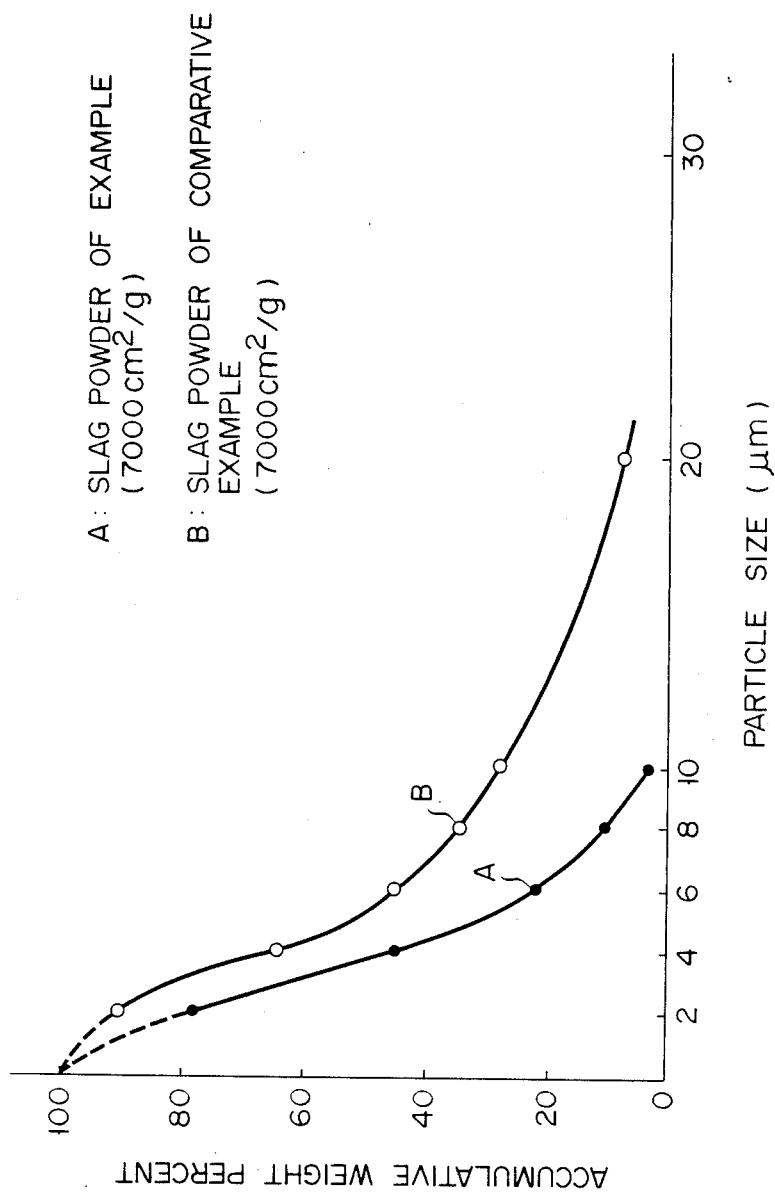

HYDRAULIC HARDENING MATERIAL AND METHOD OF MANUFACTURING THE SAME

This application is a continuation of application Ser. No. 899,384, filed Jul. 24, 1986 (now abandoned) which was the U.S. designated application of PCT/JP 85/00678 filed Dec. 10, 1985.

TECHNICAL FIELD

The present invention relates to a method of manufacturing a hydraulic hardening material using vitreous blast furnace slag as a raw material and to the hydraulic hardening material manufactured by this method.

BACKGROUND ART

Slag cement is conventionally made of vitreous blast furnace slag (hereinafter referred to as slag) such as water granulated blast furnace slag. A disadvantage of such slag cement is its slow hydraulic hardening in the early stages. In order to improve the hydration setting of cement, a technique of using finely milled slag is known. However, conventional slag milling techniques provide a maximum Blaine specific surface area of only about 4,200 cm$^2$/g. This is because upon milling to a high fineness, milling efficiency is reduced and the milling cost is very high. More specifically, as slag milling progresses, secondary particles form; the specific surface area does not increase much even if the milling time is prolonged. As a result, when slag is milled finer, milling efficiency decreases. This tendency is particularly noticeable when open circuit milling (to be described later) is performed. When slag is milled to a high fineness using milling equipment such as a ball mill, surface activity is expected to decrease due to the mechanochemical effect. Hence, due to losses in time and energy, slag is not in practice milled to a high fineness.

Although it is not a milling technique specifically developed for vitreous blast furnace slag, a technique is known for milling clinker sintered in a kiln and a small amount of gypsum. This technique is classified into open and closed circuit milling techniques.

In the open circuit milling technique, only a mill is used; and a separator is not used to obtain a product. This technique, however, can easily cause overmilling of the cement in the mill and broadening of the particle size distribution of the product. In addition, the milling temperature is increased and the cement quality may suffer.

In the closed circuit milling technique, after raw materials are milled in a ball mill, the milled powder is classified with a separator to produced fine powder. Unlike open circuit milling, this method does not require milling to a high specific surface area. With this method, therefore, the electric power unit of the overall milling system is lower than that in open circuit milling. Sturtevant and cyclone separators are most frequently used in closed circuit milling. In a Sturtevant separator, fine powder circulates within the separator. Therefore, classification efficiency is low and the product has too broad a particle size distribution. In a cyclone separator, fine powder is trapped by a cyclone. Classification efficiency is high, and the product has comparatively narrow particle size distribution.

In the manufacture of cement by closed system milling, classification is performed only as an auxiliary milling process, and classification at a specific cut size is not performed. Cement actually produced by a classifier has a Blaine specific surface area of about 3,600 to 4,200 cm$^2$/g. In the manufacture of cement by closed system milling, classification of a specific cut size is not performed for the following reason. Portland cement used to make clinkers has different levels of ease in milling in accordance with constituent minerals. If the milled clinker is classified, the mineral composition changes, therefore, classification is not preferred in this case.

DISCLOSURE OF INVENTION

It is an object of the present invention to provide a method of manufacturing a slag powder with excellent hydraulic hardening properties by finer milling of slag with high efficiency and low cost.

It is another object of the present invention to provide a slag powder with excellent hydraulic hardening properties.

In order to achieve the above objects of the present invention, there is provided a method of manufacturing an excellent hydraulic hardening material, comprising the steps of milling vitreous blast furnace slag and classifying the milled slag to obtain a slag powder having a Blaine specific surface area of 6,000 to 12,000 cm$^2$/g.

The vitreous blast furnace slag is milled to a fineness similar to that produced by conventional techniques, e.g., a Blaine specific surface area of 3,600 to 4,200 cm$^2$/g. In order to obtain a Blaine specific surface area within the aforementioned range, classification is preferably performed at a cut size of from 5 to 10 μm. For example, when milled vitreous blast furnace slag having a Blaine specific surface area of 3,600 to 4,200 cm$^2$/g is classified at a cut size of 10 μm, a slag powder having a Blaine specific surface area of about 7,000 cm$^2$/g is obtained.

In the present invention, the Blaine specific surface area of the powder is limited to the aforementioned range for the following reason. Slag powder having a Blaine specific surface area of less than 6,000 cm$^2$/g can also be manufactured by simple milling. The industrial advantage of providing a separate classification process is therefore small. When powder having a Blaine specific surface area exceeding 12,000 cm$^2$/g is desired, the test results obtained by the present inventors reveal that the cut size must be 5 μm or less. Therefore, to increase product yield on an industrial scale, very large-scale equipment is required. In view of the above, the Blaine specific surface area of the slag powder is set within the range of 6,000 to 12,000 cm$^2$/g.

According to the present invention, it is preferable that gypsum be added to unmilled slag and the resultant mixture milled. Gypsum is preferably added in an amount of 2 to 4 parts by weight in terms of SO$_3$ based on 100 parts by weight of the slag. That is, the amount of gypsum is calculated on the basis of SO$_3$. Gypsum is added in order to improve the initial strength of a hydraulic hardening material as a final product. Gypsum added to slag is almost completely included to the finer powder in the classification process and is homogeneously mixed with the finer powder. This finding has been confirmed for the first time by an experiment conducted by the present inventors.

According to the method of the present invention, the classification process need only be added next to the conventional milling process. Therefore, the manufacturing cost is low and production efficiency is high. According to the finding of the present inventors, if the Blaine specific surface area of powder is kept the same, slag powder obtained by the method of the present invention has a higher hydraulic hardening property than slag powder obtained by milling only. The hydraulic hardening property in this case is evaluated in accordance with the mortar strength of the cement used. In this manner, according to the present invention, a hydraulic hardening material with excellent quality can be manufactured.

Since the slag is homogeneous, a change of mineral composition does not occur upon classification unlike in the case of Portland cement clinker described above. This finding has also been confirmed for the first time by an experiment conducted by the present inventors.

BRIEF DESCRIPTION OF DRAWING

The accompanying drawing shows a comparison of particle size distributions of slag powder having a Blaine specific surface area of 7,000 cm$^2$/g manufactured by the method of the present invention and slag powder having the same Blaine specific surface area but manufactured by milling only.

BEST MODE FOR CARRYING OUT THE INVENTION

EXAMPLE 1

Blast furnace slag was water granulated to be completely vitreous. Table 1 below shows the chemical composition of the slag.

TABLE 1

| Chemical Composition of Slag | | | | | |
|---|---|---|---|---|---|
| SiO$_2$ | Al$_2$O$_3$ | Fe$_2$O$_3$ | CaO | MgO | TiO$_2$ |
| 34.1 | 13.5 | 0.3 | 42.3 | 4.9 | 1.6 |

The slag was milled by a ball mill to a Blaine specific surface area of 3,800 cm$^2$/g. The milled slag was classified at a cut size of 10 μm using an air flow classifier (Model name: Hosokawa micron separator MS-1) to provide slag powder having a Blaine specific surface area of 7,000 cm$^2$/g of Example 1.

The same vitreous blast furnace slag was milled with a compact ball mill (mill defined by JIS M 4002) to a Blaine specific surface area of 7,000 cm$^2$/g to provide slag of Comparative Example.

The particle size distributions of the respective slag powders were measured by using a Coulter counter method, and the obtained results are shown in the attached drawing wherein Curve A reports the results of this Example 1 and curve B reports the results of this Comparative Example. It is seen from the measurement results that even with the same Blaine specific surface area, the slag powder of Example 1 has a proportion of particles having a size of 5 μm or less, which is 1.3 to 1.4 times that of the slag powder of the Comparative Example with Curve A reporting at least 60% of the particles being 5 μm or less.

Forty parts by weight of each slag powder were mixed with 60 parts by weight of ordinary Portland cement to manufacture trial blast furnace cement samples of Example 1 and Comparative Example. The ordinary Portland cement was subjected to the physical tests defined in JIS R 5201, and the obtained results are shown in Table 2 below. The blast furnace cement samples were also subjected to the mortar strength test defined in JIS R 5201, and the obtained results are shown in Table 3 below.

TABLE 2

Results of Physical Test for Ordinary Portland Cement

| Water Content (%) | Setting Start (hr.-min.) | Setting End (hr.-min.) | Flow (mm) | Bending Strength (kgf/cm$^2$) 3 days | 7 days | 28 days | Compressive Strength (kgf/cm$^2$) 3 days | 7 days | 28 days |
|---|---|---|---|---|---|---|---|---|---|
| 26.8 | 2–42 | 3–37 | 259 | 25 | 37 | 66 | 102 | 184 | 382 |

TABLE 3

| | Bending Strength (kgf/cm$^2$) | | | Compressive Strength (kgf/cm$^2$) | | |
|---|---|---|---|---|---|---|
| | 3 days | 7 days | 28 days | 3 days | 7 days | 28 days |
| Example | 30 | 50 | 82 | 119 | 243 | 564 |
| Comparative Example | 30 | 46 | 69 | 112 | 220 | 486 |

It is seen from Table 3 that the slag powder of Example 1 imparts a very high strength to Portland blast furnace cement.

EXAMPLE 2

Relationship between Particle Size Distribution of Slag Powder and Hydraulic Hardening Property Dried water granulated blast furnace slag was milled to a Blaine specific surface area of 3,600 cm$^2$/g using a ball mill to be used in a test according to JIS M 4002. The obtained powder was measured by the light transmission sedimentation method to examine its particle size distribution. The obtained results are indicated in the column for Sample No. 1 in Table 4. The milled powder was also classified at various cut sizes with an air flow classifier to produce seven samples having different particle size distributions. The particle size distributions of the samples are indicated in the columns for Sample Nos. 2 to 8 of Table 4.

TABLE 4

| Sample No. | Size Classification (μm) | | | | | | |
|---|---|---|---|---|---|---|---|
| | 0–2 | 2–5 | 5–10 | 10–20 | 20–30 | 30–40 | 40– |
| 1 | 12.1 | 20.5 | 20.5 | 24.2 | 7.89 | 7.61 | 7.22 |
| 2 | 27.2 | 31.5 | 25.1 | 8.60 | 8.60 | 0 | 0 |
| 3 | 0.53 | 1.54 | 34.6 | 56.0 | 7.30 | 0 | 0 |
| 4 | 1.25 | 1.08 | 11.2 | 78.6 | 5.10 | 2.80 | 0 |
| 5 | 0.62 | 0.93 | 15.2 | 73.2 | 6.80 | 3.30 | 0 |
| 6 | 0.60 | 0.90 | 21.3 | 46.7 | 24.9 | 5.60 | 0 |
| 7 | 1.07 | 1.53 | 23.1 | 66.0 | 3.90 | 4.40 | 0 |

| Sample No. | Size Classification (μm) | | | |
|---|---|---|---|---|
| | | –37 | 37–44 | 44–74 | 74– |
| 8 | | 47.7 | 18.6 | 32.2 | 1.48 |

Equal amounts of slag samples Nos. 1 to 8 were mixed with ordinary Portland cement to provide Portland blast furnace cement samples. The Portland blast furnace cement samples produced were measured for their compressive strength 7 and 28 days after mixing with water according to JIS R 5201. The correlation between the proportion of particles of each size and the compressive strength of the cement was examined by single phase correlation analysis in accordance with measured compressive strength and particle size distributions of slag samples Nos. 1 to 8. The results are shown in Table 5 below.

TABLE 5

| Size Classification (μm) | Strength Stress after 7 days | Strength Stress after 28 days |
|---|---|---|
| 0-2 | 0.9751*** | 0.9091** |
| 2-5 | 0.9183** | 0.8579* |
| 5-10 | 0.1213 | -0.0010 |
| 10-20 | -0.7729 | -0.6473 |
| 20-30 | -0.1323 | -0.2446 |
| 30-40 | -0.3957 | -0.4508 |
| 40- | -0.0522 | 0.0790 |

***Correlation of 0.1%
**Correlation of 1%
*Correlation of 5%

Note that in Table 5 above the negative values in columns represent negative correlations.

Particles of 2 μm or less have a very high correlation with strength after 7 days and also a high correlation with strength after 28 days. Particles having sizes of 2 to 5 μm also have high correlation with strength after 7 days and also have some correlation with strength after 28 days.

When the results obtained in Example 2 are considered in light of the results obtained in Example 1, the slag powder according to the present invention contains many particles of 5 μm or less which have a positive correlation with compressive strength and contain substantially no particles of 10 μm or more which have a negative correlation with compressive strength. Industrial Applicability When a hydraulic hardening material manufactured by the invention is used to prepare slag cement, the resultant cement has a good hydraulic hardening property, especially at early stage.

In order to perform the method of the invention, a classifier need only be combined with a conventional milling apparatus, providing a simple process.

We claim:

1. A method of manufacturing a hydraulic hardening material, comprising the steps of: milling vitreous blast furnace slag and classifying the milled slag at a cut size of 5 to 10 μm to provide slag powder having a Blaine specific surface area of 6,000 to 12,000 cm$^2$/g.

2. A method of manufacturing a hydraulic hardening material, comprising the steps of: milling vitreous blast furnace slag by a dry process, to provide slag powder having a Blaine specific surface area of 3,600 to 4,200 cm$^2$/g and classifying the milled slag at a cut size of 5 to 10 μm to provide slag powder having a Blaine specific area of 6,000 to 12,000 cm$^2$/g.

3. A method according to claim 1, wherein the milling step comprising milling after adding gypsum to the vitreous blast furnace slag.

4. A method according to claim 2, wherein the milling step comprises milling after adding 2-4 parts by weight based on SO$_2$ content of gypsum to 100 parts by weight of the vitreous blast furnace slag.

5. A hydraulic hardening material consisting of the vitreous blast furnace slag manufactured by the method according to claim 3.

6. A hydraulic hardening material consisting of the vitreous blast furnace slag manufactured by the method according to claim 4.

7. A hydraulic hardening material consisting of the vitreous blast furnace slag manufactured by the method according to claim 5.

8. A hydraulic hardening material consisting of the vitreous blast furnace slag manufactured by the method according to claim 6.

9. A slag cement consisting essentially of 50-60% of the Portland Cement admixed with an hydraulic hardening material prepared by the milling vitreous blast furnace slag and thereafter classifying the milled slag at a cut size of 5 to 10 μm to provide said hardening material as a slag powder with a Blaine specific surface area of 6,000 to 12,000 cm$^2$/g.

10. A slag cement consisting essentially of equal amounts of a hardener and of Portland cement and wherein said hardener is admixed with an hydraulic hardening material prepared by milling vitreous blast furnace slag and thereafter classifying the milled slag to provide said hardening material as a slag powder with a Blaine specific surface area of 6,000 to 12,000 cm$^2$/g.

11. A method of preparing slag cement comprising the step of milling vitreous blast furnace slag and classifying the milled slag at a cut size of 5 to 10 μm to provide slag powder having a Blaine specific surface area of 6,000 to 12,000 cm$^2$/g.

12. The method of claim 11 wherein there are mixed together 50-60% of the Portland cement and 40-50% of the slag powder.

13. The method of claim 11 wherein the step of milling vitreous blast furnace slag comprises milling by a dry process, slag powder to have a Blaine specific surface area of 3,600 to 4,200 cm$^2$/g and classifying the milled slag to provide slag powder having a Blaine specific surface area of 6,000 to 12,000 cm$^2$/g.

* * * * *

UNITED STATES PATENT AND TRADEMARK OFFICE
CERTIFICATE OF CORRECTION

PATENT NO. : 4,981,519

DATED : January 1, 1991

INVENTOR(S) : FUKAYA et al

It is certified that error appears in the above-identified patent and that said Letters Patent is hereby corrected as shown below:

<u>COLUMN 6</u> --

Claim 5, line 3, change:

"according to claim 3" to --according to claim 1--.

Claim 6, line 3, change:

"according to claim 4" to --according to claim 2--.

Claim 7, line 3, change:

"according to claim 5" to --according to claim 3--.

Claim 8, line 3, change:

"according to claim 6" to --according to claim 4--.

Signed and Sealed this

Twentieth Day of October, 1992

*Attest:*

DOUGLAS B. COMER

*Attesting Officer*     *Acting Commissioner of Patents and Trademarks*